United States Patent
Stark et al.

(10) Patent No.: US 12,282,778 B2
(45) Date of Patent: *Apr. 22, 2025

(54) SELECTIVE USE OF BRANCH PREDICTION HINTS

(71) Applicant: Intel Corporation, Santa Clara, CA (US)

(72) Inventors: Jared W. Stark, Portland, OR (US); Ahmad Yasin, Kafr Manda (IL); Ajay Amarsingh Singh, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,974

(22) Filed: Oct. 3, 2023

(65) Prior Publication Data

US 2024/0118898 A1 Apr. 11, 2024

Related U.S. Application Data (63) Continuation of application No. 17/033,749, filed on Sep. 26, 2020, now Pat. No. 11,809,873.

(Continued)

(51) Int. Cl.
 *G06F 9/38* (2018.01)
 *G06F 9/30* (2018.01)
 *G06F 12/0804* (2016.01)

(52) U.S. Cl.
 CPC ........ *G06F 9/3842* (2013.01); *G06F 9/30058* (2013.01); *G06F 9/30145* (2013.01); *G06F 9/3867* (2013.01); *G06F 12/0804* (2013.01)

(58) Field of Classification Search
 CPC .. G06F 9/3842; G06F 9/3867; G06F 9/30145; G06F 12/0804
 See application file for complete search history.

(56) References Cited

U.S. PATENT DOCUMENTS

| | | | |
|---|---|---|---|
| 6,427,206 B1 * | 7/2002 | Yeh | G06F 9/3844 712/240 |
| 7,673,122 B1 * | 3/2010 | Song | G06F 9/3848 712/240 |

(Continued)

OTHER PUBLICATIONS

Briejer, M., et al., "Extending the Cell SPE with Energy Efficient Branch Prediction", 16th European Conference—Computer Vision—ECCV, 2020. pp. 304-315.

(Continued)

*Primary Examiner* — Zachary K Huson
(74) *Attorney, Agent, or Firm* — Nicholson De Vos Webster & Elliott LLP (57) ABSTRACT

Embodiments of apparatuses, methods, and systems for selective use of branch prediction hints are described. In an embodiment, an apparatus includes an instruction decoder and a branch predictor. The instruction decoder is to decode a branch instruction having a hint. The branch predictor is to provide a prediction and a hint-override indicator. The hint-override indicator is to indicate whether the prediction is based on stored information about the branch instruction. The prediction is to override the hint if the hint-override indicator indicates that the prediction is based on stored information about the branch instruction.

20 Claims, 8 Drawing Sheets

Related U.S. Application Data

(60) Provisional application No. 63/017,583, filed on Apr. 29, 2020.

(56) References Cited

U.S. PATENT DOCUMENTS

| | | | |
|---|---|---|---|
| 11,809,873 B2* | 11/2023 | Stark | G06F 9/30145 |
| 2008/0059779 A1 | 3/2008 | Davis et al. | |
| 2013/0007425 A1* | 1/2013 | Cantin | G06F 9/3848 |
| | | | 712/240 |
| 2013/0198499 A1* | 8/2013 | Dice | G06F 9/30058 |
| | | | 712/E9.032 |

OTHER PUBLICATIONS

European Search Report and Search Opinion, EP App. No. 20208858.9, May 17, 2021, 08 pages.
Notice of Allowance, U.S. Appl. No. 17/033,749, filed Sep. 20, 2023, 3 pages.
Notice of Allowance, U.S. Appl. No. 17/033,749, filed Jul. 3, 2023, 9 pages.
Office Action, EP App. No. 20208858.9, Jun. 23, 2023, 7 pages.
Office Action, EP App. No. 20208858.9, May 18, 2022, 5 pages.
Office Action, EP App. No. 20208858.9, Nov. 8, 2024, 6 pages.

* cited by examiner

SELECTIVE USE OF BRANCH PREDICTION HINTS

FIELD OF INVENTION

The field of invention relates generally to computer architecture, and, more specifically, to branch prediction.

BACKGROUND

The processing devices within many computers and other information processing systems include branch prediction hardware. Branch prediction is useful to improve performance in a pipelined processor because it allows for the pipeline to continue to be filled as instructions following the branch are speculatively executed. Mispredictions are typically handled by flushing the pipeline, so increasing the accuracy of branch prediction typically increases the performance of a processor.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the invention, a "/" character between terms may mean that an embodiment may include or be implemented using, with, and/or according to the first term and/or the second term (and/or any other additional terms).

As pipeline depth and width increase in processor architectures, increasing the branch prediction rate has a greater impact on performance. Therefore, embodiments of the invention that may improve the branch prediction rate may be increasingly desirable. Embodiments of the invention may improve the branch prediction rate by providing for the benefits of both hardware branch predictors and branch prediction hints in instructions.

Embodiments of the invention may include a branch predictor implemented in logic gates, storage elements, and any other type of circuitry, and may be integrated into the circuitry of a processor core, a processing device, or any other apparatus in a computer or other information processing system. Accordingly, processors and systems such as those illustrated in FIGS. 1 through 6 may include embodiments of the invention.

Processor cores according to embodiments of the invention may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 1A:
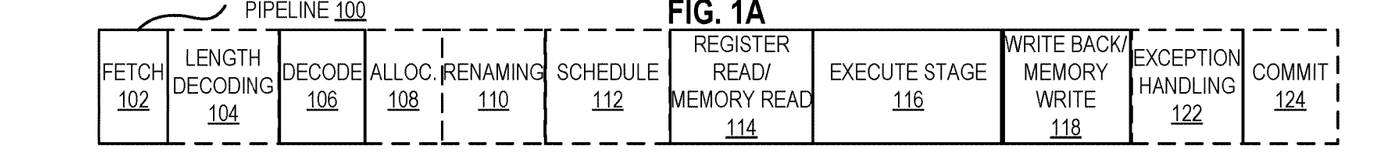
FIG. 1A is a block diagram illustrating both an exemplary in-order pipeline and an exemplary register renaming, out-of-order issue/execution pipeline according to embodiments of the invention.
Figure 1B:
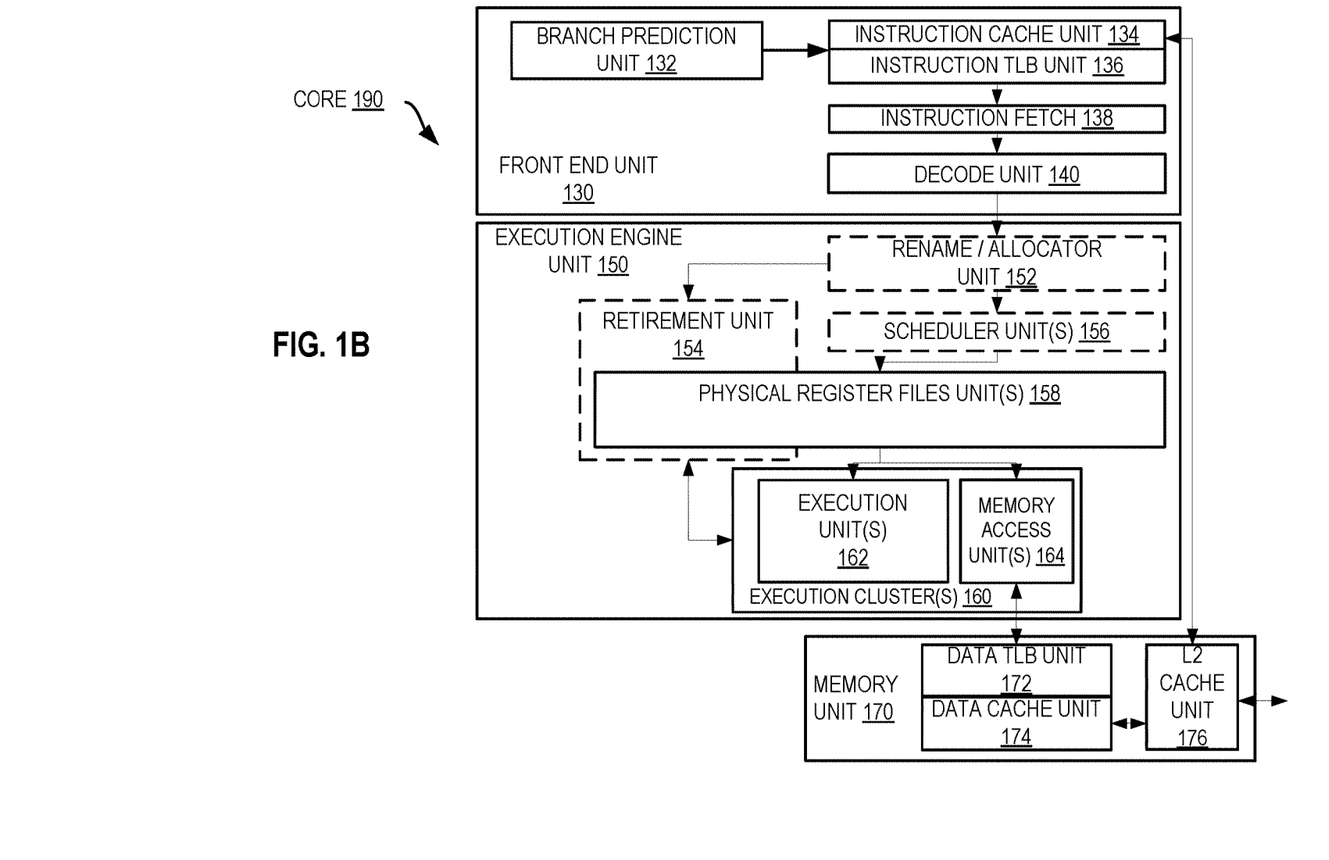
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front-end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front-end unit 130 includes a branch prediction unit 132, which represents a branch prediction unit or branch predictor according to an embodiment of the present invention.

Branch prediction unit 132 is coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front-end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general-purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
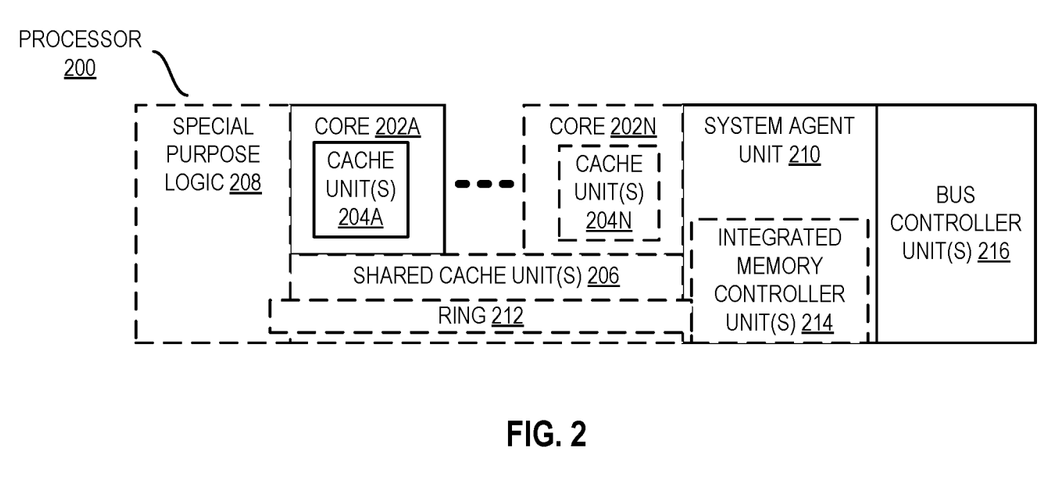
FIG. 2 is a block diagram of a processor that may have more than one core, may have an integrated memory controller, and may have integrated graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, Bic MOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208 (integrated graphics logic 208 is an example of and is also referred to herein as special purpose logic), the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
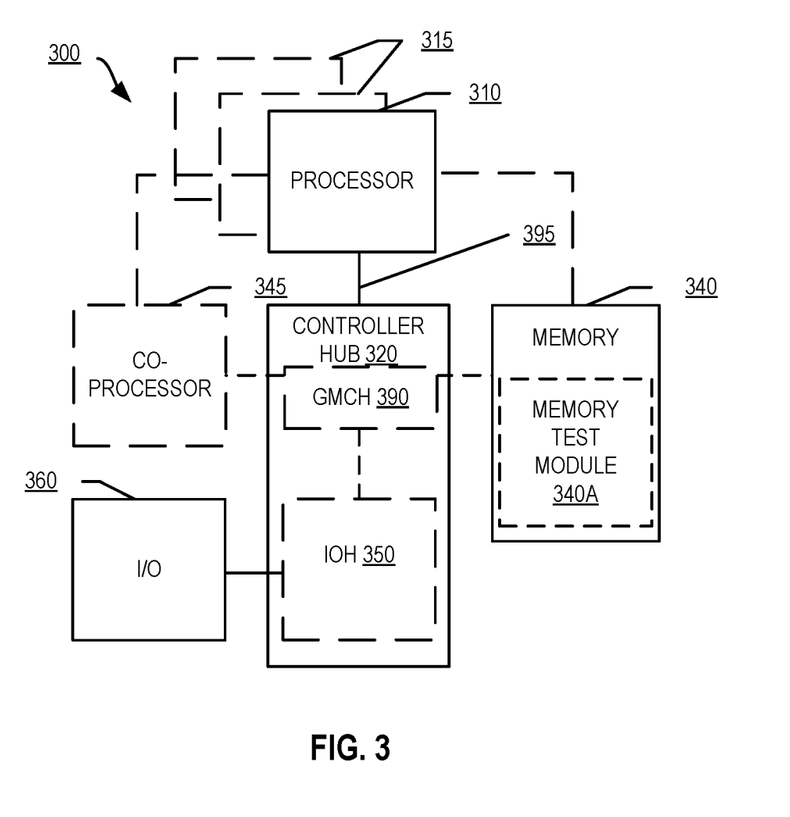
FIG. 3 is a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment, the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random-access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
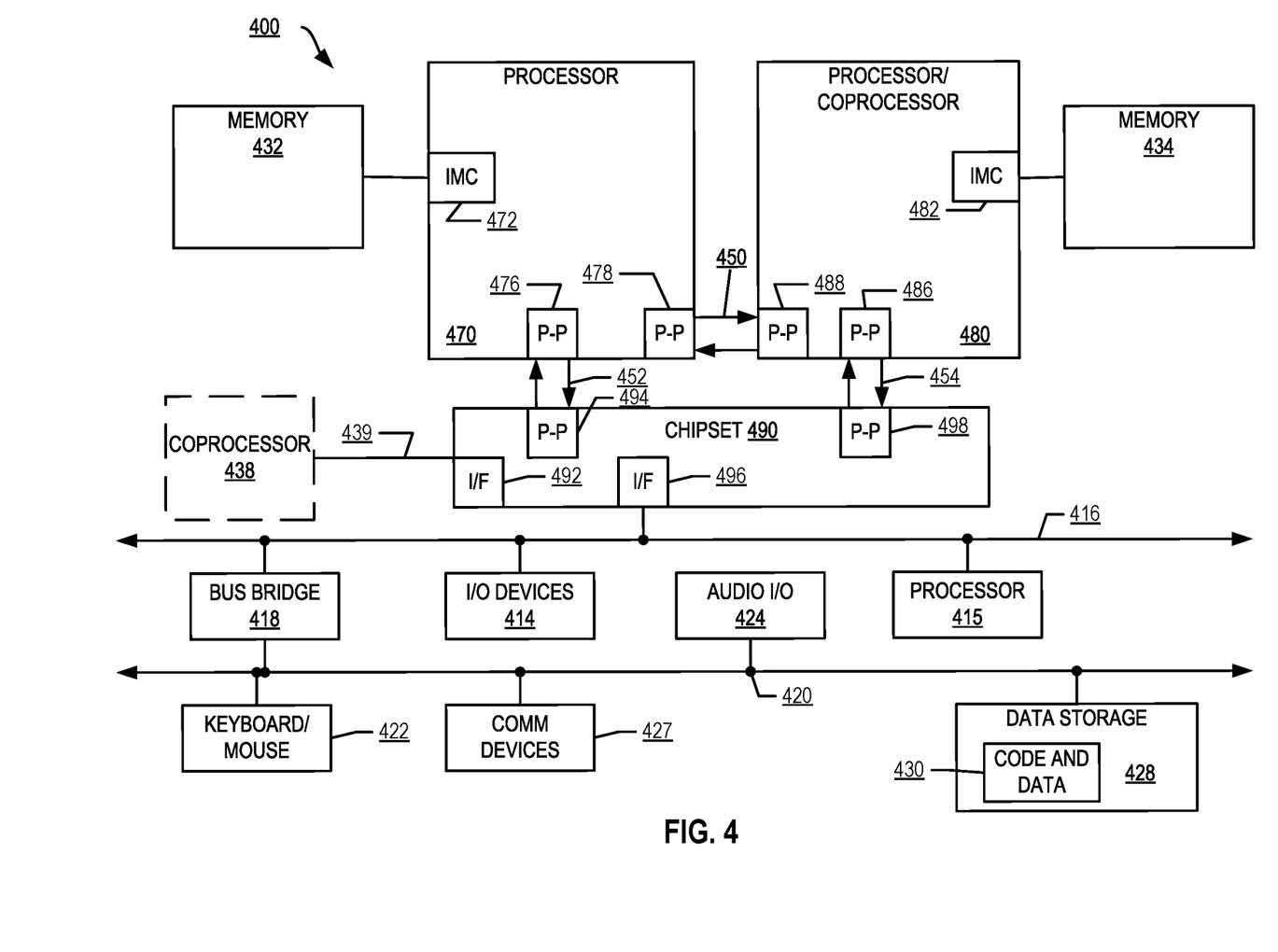
FIG. 4 is a block diagram of a first more specific exemplary system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller unit's point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 492. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
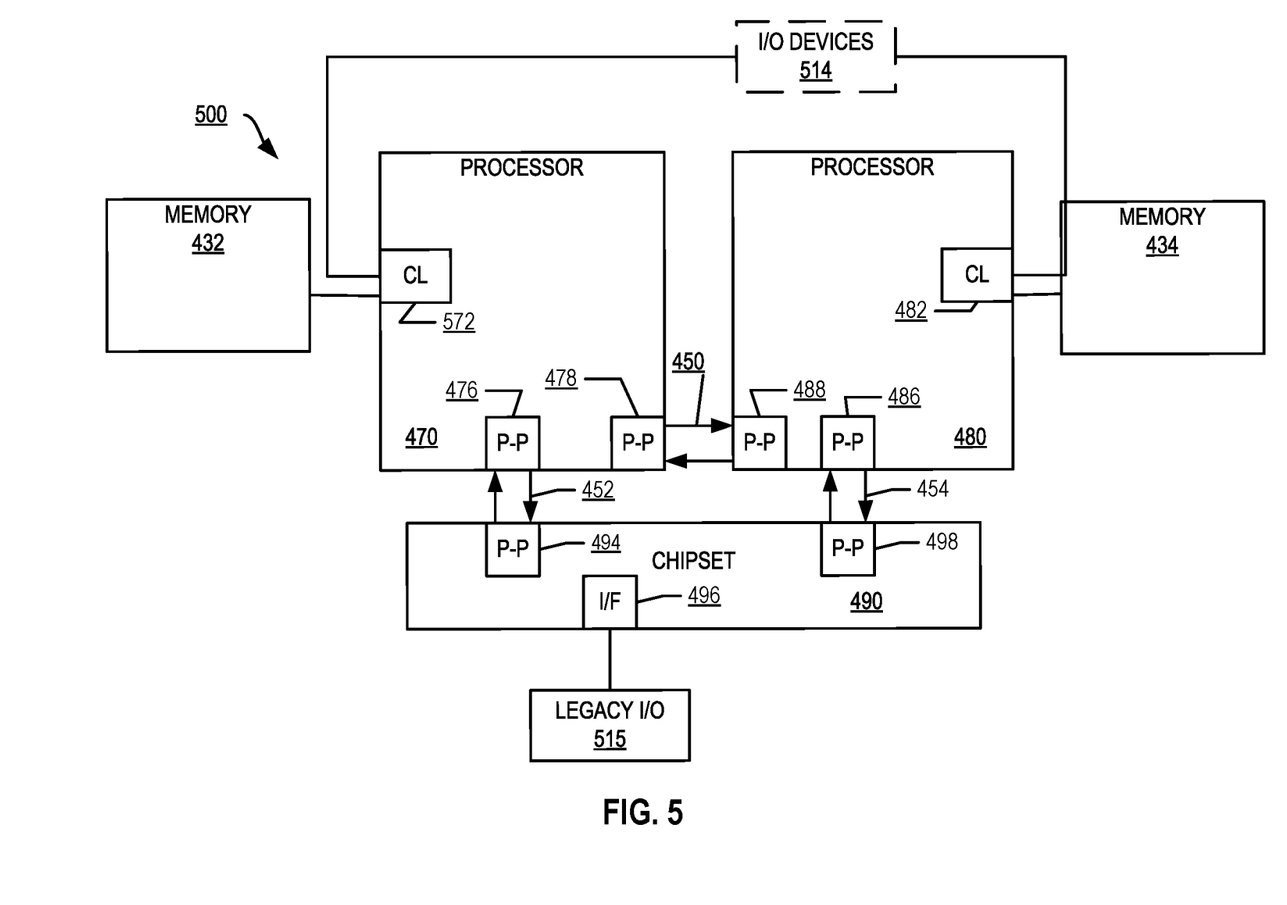
FIG. 5 is a block diagram of a second more specific exemplary system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
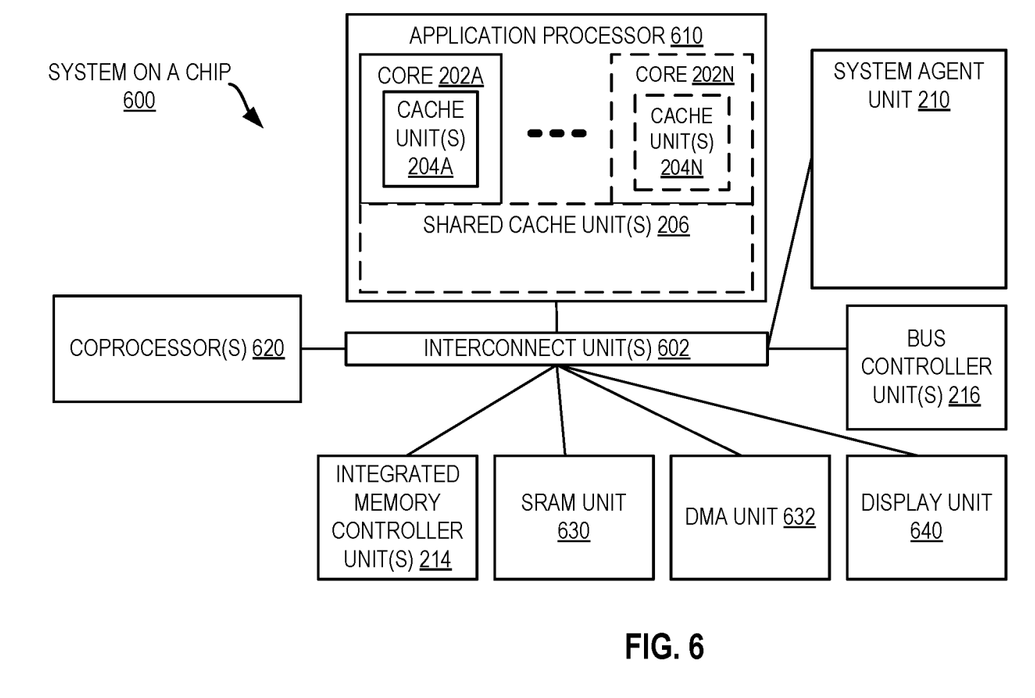
FIG. 6 is a block diagram of a system-on-chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N, which include cache units 204A-N, and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Figure 7:
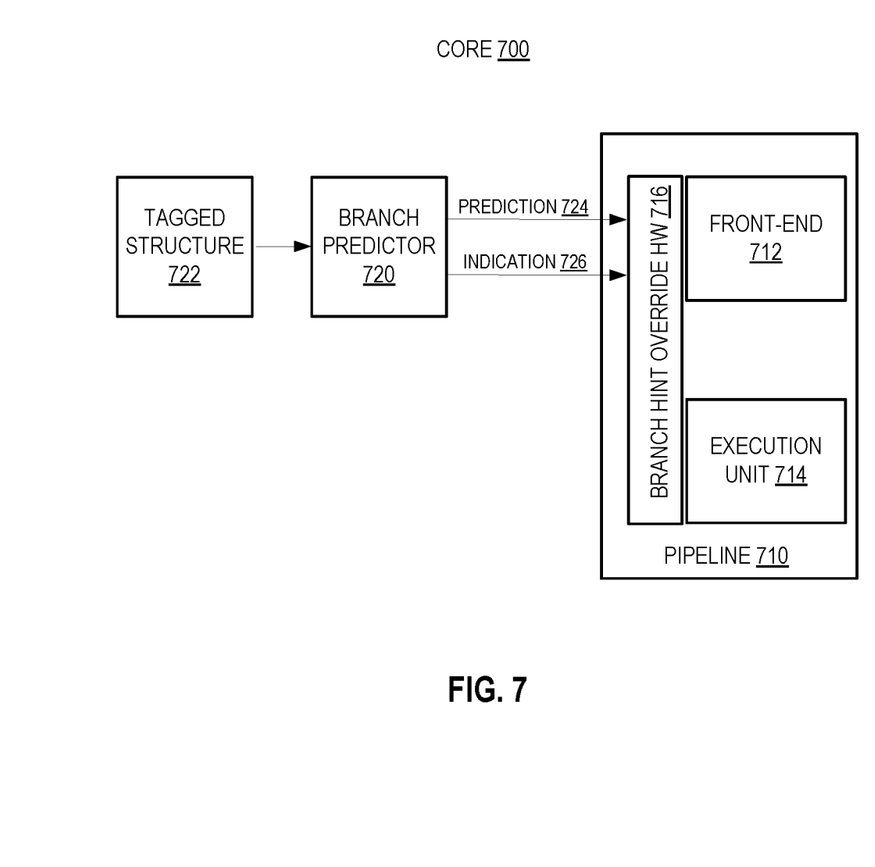
FIG. 7 is a block diagram of an embodiment including branch hint override hardware according to embodiments.

In embodiments, a branch predictor or branch prediction unit (such as branch prediction unit 132 in FIG. 1 or branch predictor 720 in FIG. 7) may include a capability to determine whether it has or has access to stored information that it may use to predict or help to predict the path of a conditional branch instruction. In other words, a branch predictor may provide not only a prediction (e.g., prediction 724 in FIG. 7), but also an indication (e.g., indication 726 in FIG. 7) of whether the prediction is based on stored information about that particular branch instruction (e.g., an indication that a particular prediction is based on stored information or is instead a default or other prediction rendered when the branch predictor has no stored information about a particular branch instruction).

For example, a branch predictor may include or access tables or other structures in which, as conditions associated with conditional branch instructions are resolved, results or other information (e.g., whether a prediction was correct) is stored as history, as patterns, or in other forms such that future branch predictions (e.g., for a subsequent instance of the same branch instruction or another branch instruction related to or associated with an earlier one or more branch instructions) may be based on that information. Furthermore, the entries and/or information in these structures may be tagged (e.g., with instruction addresses or pointers) or otherwise identifiable such that for a result of a branch predictor (e.g., a prediction or other indication of whether to take a branch associated with a particular branch instruction), it may be determined (e.g., by hardware in the branch predictor) whether that result is based on information stored in such a structure (a tagged structure), in contrast to a result for which it cannot be determined whether stored information was used (e.g., because the prediction mechanism sometimes uses information stored in untagged structures).

Therefore, a branch predictor according to embodiments may use one or more tagged structures (such as tagged structure 722 in FIG. 7) to make predictions and produce two results: a first result that indicates the branch predictor's decision about whether a branch should be taken (e.g., which may be a prediction based on stored information about or related to the particular branch instruction or a prediction rendered when no stored information about the particular branch instruction is available) and a second result that indicates whether the first result is based on stored information.

In embodiments, a branch predictor may be hardwired, configured/configurable, or programmed/programmable to choose a default for the first result when no stored information is available. In embodiments, this default may be to not take the branch associated with the branch instruction.

In embodiments, a branch instruction may provide for a hint to be associated with the use of the branch instruction. For example, an instruction format of a conditional branch instruction (e.g., a jump if condition is met or JCC instruction) may provide for a hint to be coded into a prefix such that the hint may provide an expected or assumed outcome of the execution of the branch instruction (e.g., a compiler, interpreter, scheduler, decoder, etc. may use the hint to process code assuming it will be executed on a path or in a sequence indicated by the hint).

Embodiments may provide for selectively using branch instruction hints. For example, a front-end (e.g., front-end unit 130 in FIG. 1, front-end unit 712 in FIG. 7) and/or execution unit(s) (e.g., execution engine unit 150 of FIG. 1, execution unit 714 in FIG. 7) of a core may include circuitry and/or control logic (branch hint override hardware 716 in FIG. 7) to override a branch instruction hint (e.g., with a first branch predictor result as described above) if a branch predictor has used stored information to provide a prediction (e.g., as indicated by a second branch predictor result as described above). To implement embodiments within a pipelined core (e.g., core 190 and pipeline 100 in FIG. 1, core 700 and pipeline 710 in FIG. 7), a bit (which may be referred to as a hint-override bit) may be associated with a branch instruction (e.g., in the decode stage) and passed down the pipeline to indicate whether a hardware predictor had stored information with which to make a prediction, such that a prediction based on stored information could override a hint (e.g., by flushing the pipeline of instructions following the hint path and refilling it with instructions following the path predicted based on stored information). In implementations in which multiple branch hints may be associated with a single instance of a branch instruction, embodiments may provide for ignoring all hints except one (e.g., the last, the most recent, etc.).

In embodiments, a core, processor, or system may include counters and/or sampling hardware to count occurrences of certain events (e.g., performance counters, precise event-based sampling (PEBS) hardware, instruction-based sampling (IBS) hardware). These counters and/or other hardware may be configured or programmed to count a particular pair of events. To describe these two events, the term "ANT" (for always not taken) may be defined to mean a conditional branch instruction for which the branch predictor has no stored information (e.g., the first result from the branch predictor is to not take the branch, and the second result indicates that the first result was not based on stored information). In embodiments, the two events to be counted (e.g., at retirement of branch instructions) are ANTs that were correctly predicted and ANTs that were mis-predicted. Note that these two events may be counted indirectly (e.g., by counting total ANTs instead of either one of them). In other embodiments, such as embodiments in which the branch predictor's default is to take the branch, a corresponding pair of events may be counted for ATs (always taken, e.g., the first result from the branch predictor is to take the branch, and the second result indicates that the first result was not based on stored information).

Embodiments may include determinations of which branch instructions to which hints are added. In an embodiment, code may be profiled, using the pair of events described above, to potentially improve performance when the code is executed by selectively adding hints to branch instructions. For example, code may be profiled to identify or attempt to identify branch instructions for which the hardware predictor is unlikely to have stored information upon which to base a prediction, so that hints may be added to these branch instructions. In this descriptions, these branch instructions and/or the spots in the code where they occur may be called non-hot spots, in contrast to hot spots (branch instructions and/or spots in code for which the hardware predictor is likely to have stored information because these spots are executed more often; for example, in a loop).

In an embodiment, two profiling runs of code may be performed to find branch instructions to which to add hints. For example, a first profiling run may be used to identify the static instruction pointers (IPs) of mis-predicted ANTs, and a second profiling run may be used to measure the majority direction of each static IP identified in the first run. Taken hints (hints to indicate that the branch is expected to be taken) may be added to the branch instructions corresponding to the static IPs for which the majority direction was taken. The use of two profiling runs may overcome the issue that when a branch that is ANT becomes mispredicted, from then on it is no longer an ANT.

In a method embodiment, code may be run on a system including hardware to support an embodiment as described above. In a method embodiment (e.g., method embodiment 800 in FIG. 8), a branch predictor may determine whether it has stored information upon which to base a prediction, and if so, make a prediction that overrides a branch instruction hint.

Figure 8:
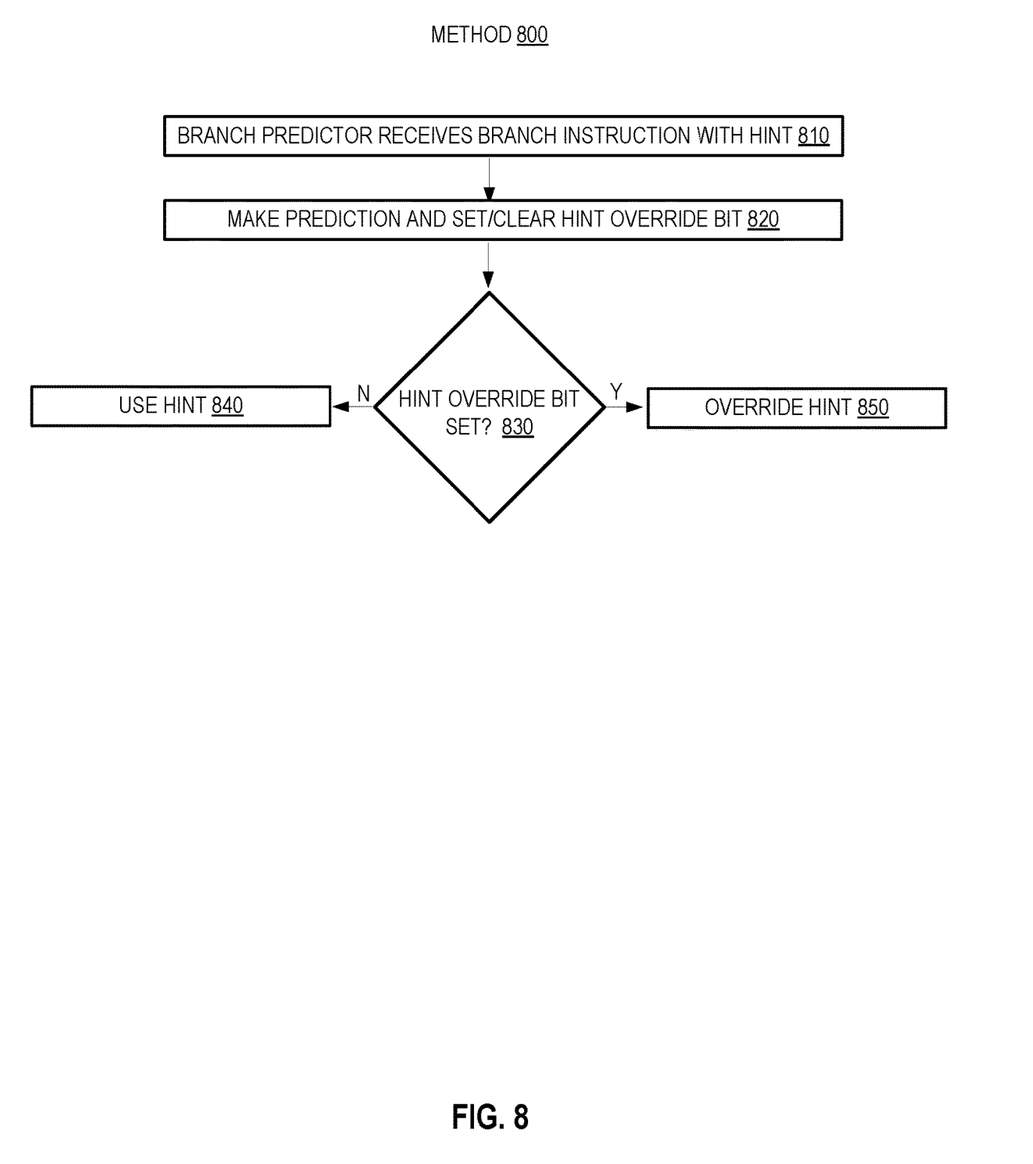
FIG. 8 shows a method of overriding a branch hint override according to embodiments.

For example, in 810 of method 800 of FIG. 8, an IP of a branch instruction having a hint (e.g., a not taken hint) is received by a branch predictor (e.g., 132, 720). In 820, an entry for the IP (if one exists) may be found in a tagged structure, a prediction (e.g., taken) may be made based on the information stored in the entry, and a hint-override bit may be set to indicate that the prediction is based on stored information. Also in 820, if no entry is found, the branch predictor may make a prediction by default (e.g., not taken), and clear the hint-override bit (or leave it in a default cleared state) to indicate that the prediction is not based on stored information. If in 830 the hint-override bit is set, then in 850 the hint (e.g., not taken) associated with the branch instruction may be overridden by the prediction (e.g., taken), such that instruction execution proceeds on the path indicated by the prediction (e.g., the branch taken path) instead of the path 840 indicated by the hint (e.g., the branch not taken path).

In an embodiment, an apparatus includes an instruction decoder and a branch predictor. The instruction decoder is to decode a branch instruction having a hint. The branch predictor is to provide a prediction and a hint-override indicator. The hint-override indicator is to indicate whether the prediction is based on stored information about the branch instruction. The prediction is to override the hint if the hint-override indicator indicates that the prediction is based on stored information about the branch instruction.

In embodiments, the apparatus also includes a tagged structure to provide the stored information; the instruction decoder is to associate a branch hint override indicator to the decoded branch instruction; the branch hint override indicator is to be passed down an execution core pipeline from the instruction decoder; the override the hint includes flushing of the execution pipeline of instructions following a hint path; the apparatus also include a counter to count conditional branch instructions for which the branch predictor has no stored information and for which the prediction is to not take a branch; the apparatus also include a counter to count correct predictions for conditional branch instructions for which the branch predictor has no stored information and for which the prediction is to not take a branch; the apparatus also includes a counter to count mispredictions for conditional branch instructions for which the branch predictor has no stored information and for which the prediction is to not take a branch; the apparatus also includes a counter to count conditional branch instructions for which the branch predictor has no stored information and for which the prediction is to take a branch; the apparatus also includes a counter to count correct predictions for conditional branch instructions for which the branch predictor has no stored information and for which the prediction is to take a branch; and/or the apparatus also includes comprising a counter to count mispredictions for conditional branch instructions for which the branch predictor has no stored information and for which the prediction is to take a branch.

In embodiments, a method may include receiving, by a branch predictor, a branch instruction with a hint; making a prediction; determining whether the prediction was based on stored information about the branch instruction; setting a hint-override indicator if the prediction was based on stored information; and overriding the hint if the hint-override indicator indicates that the prediction was based on stored information.

In embodiments, the method also includes using the hint if the hint-override indicator indicates that the prediction was not based on stored information; overriding the hint includes flushing an execution pipeline of instructions following a hint path; counting conditional branch instructions for which the branch predictor had no stored information and for which the prediction was to not take a branch;

counting correct predictions for conditional branch instructions for which the branch predictor had no stored information and for which the prediction was to not take a branch; and/or counting mispredictions for conditional branch instructions for which the branch predictor had no stored information and for which the prediction was to not take a branch.

In embodiments, a method may include executing code including branch instructions having hints on a processor having a branch predictor to provide a prediction and a hint-override indicator, wherein the hint-override indicator is to indicate whether the prediction is based on stored information about the branch instruction; overriding the hints if the hint-override indicator indicates that the prediction is based on stored information about the corresponding branch instruction; and counting mispredictions for conditional branch instructions for which the branch predictor had no stored information and for which the prediction was to not take a branch.

In embodiments, the method may also include profiling the code based on the count of mispredictions, wherein profiling includes finding branch instructions to which to add hints.

In embodiments, an apparatus may include means for performing any function disclosed herein. In embodiments, an apparatus may comprise a data storage device that stores code that when executed by a hardware processor causes the hardware processor to perform any method disclosed herein. An apparatus may be as described in the detailed description. A method may be as described in the detailed description. In embodiments, a non-transitory machine-readable medium may store code that when executed by a machine causes the machine to perform a method comprising any method disclosed herein.

What is claimed is:

1. An apparatus comprising:
   an instruction decoder to decode a branch instruction having a hint; and
   a branch predictor to provide a prediction to override the hint if the prediction is based on stored information about the branch instruction.

2. The apparatus of claim 1, further comprising a tagged structure to provide the stored information.

3. The apparatus of claim 1, wherein the instruction decoder is to associate a branch hint override indicator to the decoded branch instruction.

4. The apparatus of claim 3, wherein the branch hint override indicator is to be passed down an execution core pipeline from the instruction decoder.

5. The apparatus of claim 4, wherein overriding the hint includes flushing of the execution pipeline of instructions following a hint path.

6. The apparatus of claim 1, further comprising a counter to count conditional branch instructions for which the branch predictor has no stored information and for which the prediction is to not take a branch.

7. The apparatus of claim 1, further comprising a counter to count correct predictions for conditional branch instructions for which the branch predictor has no stored information and for which the prediction is to not take a branch.

8. The apparatus of claim 1, further comprising a counter to count mispredictions for conditional branch instructions for which the branch predictor has no stored information and for which the prediction is to not take a branch.

9. The apparatus of claim 1, further comprising a counter to count conditional branch instructions for which the branch predictor has no stored information and for which the prediction is to take a branch.

10. The apparatus of claim 1, further comprising a counter to count correct predictions for conditional branch instructions for which the branch predictor has no stored information and for which the prediction is to take a branch.

11. The apparatus of claim 1, further comprising a counter to count mispredictions for conditional branch instructions for which the branch predictor has no stored information and for which the prediction is to take a branch.

12. A method comprising:
    receiving, by a branch predictor, a branch instruction with a hint;
    making a prediction;
    determining whether the prediction was based on stored information about the branch instruction; and
    overriding the hint if the prediction was based on stored information.

13. The method of claim 12, further comprising using the hint if the prediction was not based on stored information.

14. The method of claim 12, wherein overriding the hint includes flushing an execution pipeline of instructions following a hint path.

15. The method of claim 14, further comprising counting conditional branch instructions for which the branch predictor had no stored information and for which the prediction was to not take a branch.

16. The method of claim 14, further comprising counting correct predictions for conditional branch instructions for which the branch predictor had no stored information and for which the prediction was to not take a branch.

17. The method of claim 14, further comprising counting mispredictions for conditional branch instructions for which the branch predictor had no stored information and for which the prediction was to not take a branch.

18. A method comprising:
    executing code including branch instructions having hints on a processor having a branch predictor to provide a prediction;
    overriding the hints if the prediction is based on stored information about the corresponding branch instruction; and
    counting mispredictions for conditional branch instructions for which the branch predictor had no stored information and for which the prediction was to not take a branch.

19. The method of claim 18, further comprising profiling the code based on the count of mispredictions.

20. The method of claim 19, wherein profiling includes finding branch instructions to which to add hints.

* * * * *